(12) United States Patent
Lebner

(10) Patent No.: US 12,440,212 B2
(45) Date of Patent: Oct. 14, 2025

(54) TABBED AND SPLIT DUAL LINER

(71) Applicant: CLOZEX MEDICAL, INC., West Bridgewater, MA (US)

(72) Inventor: Michael Lebner, Wellesley Hills, MA (US)

(73) Assignee: Clozex Medical, Inc., West Bridgewater, MA (US)

(*) Notice: Subject to any disclaimer, the term of this patent is extended or adjusted under 35 U.S.C. 154(b) by 395 days.

(21) Appl. No.: 18/002,001

(22) PCT Filed: Jun. 19, 2020

(86) PCT No.: PCT/US2020/038600
§ 371 (c)(1),
(2) Date: Dec. 15, 2022

(87) PCT Pub. No.: WO2021/257083
PCT Pub. Date: Dec. 23, 2021

(65) Prior Publication Data
US 2023/0248363 A1    Aug. 10, 2023

(51) Int. Cl.
*A61B 17/08*    (2006.01)
*A61F 13/02*    (2024.01)
*A61B 17/00*    (2006.01)

(52) U.S. Cl.
CPC .......... *A61B 17/085* (2013.01); *A61F 13/024* (2013.01); *A61B 2017/00862* (2013.01); *A61B 2017/081* (2013.01); *A61B 2017/086* (2013.01)

(58) Field of Classification Search
CPC .............. A61B 17/085; A61B 17/0466; A61B 2017/086; A61F 13/0259; A61F 13/0263; A61F 13/0266
See application file for complete search history.

(56) References Cited

U.S. PATENT DOCUMENTS 4,646,731 A * 3/1987 Brower ................ A61B 17/085
602/57
6,329,564 B1   12/2001 Lebner
(Continued)

FOREIGN PATENT DOCUMENTS

WO    2003053296 A1    7/2003
WO    2005009284 A2    2/2005
(Continued)

OTHER PUBLICATIONS

Extended European Search Report dated Feb. 2, 2024 from corresponding European Patent Application No. 20940947.3.
(Continued)

*Primary Examiner* — Katherine H Schwiker
(74) *Attorney, Agent, or Firm* — Pierce Atwood LLP; Christopher A. Baxter

(57) ABSTRACT

Disclosed is a two-component medical device useful for closing a wound or incision. The two-component medical device includes first and second adhesive-backed anchoring members having wound edges. A first and a second release liner protect the first adhesive-backed surface of the first adhesive-backed anchoring member. A first and a second release liner also protects the second adhesive-backed anchoring member. Each of the first and second release liners include a tab portion for removal of the associated first or second release liner.

20 Claims, 6 Drawing Sheets

(56) References Cited

U.S. PATENT DOCUMENTS

| | | |
|---|---|---|
| 6,822,133 B2 | 11/2004 | Lebner |
| 6,831,205 B2 | 12/2004 | Lebner |
| 7,332,641 B2 | 2/2008 | Lebner et al. |
| 7,354,446 B2 | 4/2008 | Lebner |
| 7,414,168 B2 | 8/2008 | Lebner |
| 7,511,185 B2 | 3/2009 | Lebner |
| 7,563,941 B2 | 7/2009 | Lebner et al. |
| 7,838,718 B2 | 11/2010 | Lebner |
| 7,981,136 B2 | 7/2011 | Weiser |
| 8,636,763 B2 | 1/2014 | Lebner |
| 2007/0276353 A1* | 11/2007 | Sundstrom ....... A61B 17/12009 604/500 |
| 2008/0228219 A1* | 9/2008 | Weiser ................. A61B 17/085 606/215 |
| 2010/0228287 A1 | 9/2010 | Jeekel et al. |
| 2013/0345744 A1 | 12/2013 | Weiser |
| 2019/0343524 A1 | 11/2019 | Weiser |

FOREIGN PATENT DOCUMENTS

| | | |
|---|---|---|
| WO | 2005037061 A2 | 4/2005 |
| WO | 2017052549 A1 | 3/2017 |

OTHER PUBLICATIONS

Office Action dated Jan. 23, 2024, and English summary thereof, from corresponding Japanese Patent Application No. 2022-578683.

* cited by examiner

TABBED AND SPLIT DUAL LINER

RELATED APPLICATION

This application is a 371 of International Application Number PCT/US20/38600, filed on Jun. 19, 2020. The entire contents of the above application are incorporated herein by reference.

BACKGROUND

A number of United States patents have issued naming inventor Michael Lebner and directed toward a two-component medical device for closing a wound or incision, or methods related to same. Examples of such patents include U.S. Pat. Nos. 6,329,564; 6,831,205; 6,822,133; 7,511,185; 8,636,763; 7,414,168; 7,332,641; 7,354,446; 8,636,763; 7,838,718; 7,414,168 and 7,563,941, the disclosures of which are incorporated herein by reference. A common feature of these two component wound closure devices are a pair of (i.e., a first and a second) adhesive-backed anchoring members that are adhered to the skin on opposite sides of the wound or incision to be closed. Each of the first and second adhesive-backed anchoring members comprise an edge, referred to as a wound edge, to be applied generally parallel and adjacent to the wound to be closed.

The preferred method for attaching the pair of adhesive-backed anchoring members is a sequential method wherein adhesive is exposed on a first adhesive-backed anchoring member, and the first adhesive-backed anchoring member is applied on a first side of the wound or incision. Following application of the first adhesive-backed anchoring member, the second adhesive-backed anchoring member is applied on the second side of the wound or incision.

Release liners are employed to protect the adhesive on the adhesive-backed anchoring members prior to application. A variety of prototypes were manufactured and tested for acceptance by the medical community. In one such embodiment, a single release liner was used to protect the adhesive-backed portion of the first anchoring member, and a second single release liner was used to protect the adhesive-backed portion of the second anchoring member. It will be recognized that medical practitioners wear gloves when applying wound closure devices to an open wound, and feedback from practitioners included comments related to the fact that gloved fingers tended to stick to the adhesive-backed surfaces during application, making the process somewhat difficult.

Another prototype developed employed a single release liner protecting the adhesive-backed surfaces of both the first and second adhesive-backed anchoring members. In use, medical practitioners tended to expose the adhesive on the first adhesive-backed anchoring member, leaving a portion of the release liner adhered to the second adhesive-backed anchoring member. Following application of the first adhesive-backed anchoring member, the single release liner was completely removed thereby exposing the adhesive on the second adhesive-backed anchoring member and the second adhesive-backed anchoring member was applied to the skin. Feedback from the medical community concerning the single release liner embodiment was similar in that gloved fingers tended to stick to the adhesive-backed surfaces during application making the process somewhat difficult.

In an effort to address feedback from medical practitioners, a two-stage release liner was developed and disclosed in U.S. Pat. No. 7,354,446. In this two-stage system, a first single release liner was utilized to protect the adhesive-backed surface of the first adhesive-backed anchoring member and a second single release liner was utilized to protect the adhesive-backed surface of the second adhesive-backed anchoring member.

Focusing initially on the first adhesive-backed anchoring member, a semi-rigid tab was adhered to a portion of the exposed surface of the adhered release liner. The semi-rigid tab included a first edge positioned generally parallel to the wound edge of the first adhesive-backed anchoring member. The semi-rigid tab was adhered to a portion of the exposed surface of the adhered release liner such that the first edge of the semi-rigid tab was at a position intermediate on the release liner between the portion of the release liner protecting the edge of the first adhesive-backed anchoring member generally opposite the wound edge of the first adhesive-backed anchoring member. The semi-rigid tab included a second edge extending unattached beyond the first wound edge of the first adhesive-backed anchoring member (and the intermediate release liner to which it was adhered).

To apply the first adhesive-backed anchoring member on one side of a wound or incision to be closed, a medical practitioner would first lift the semi-rigid tab (and the adhered portion of the release liner) by urging the unattached portion of the semi-rigid tab away from the wound edge of the first adhesive-backed anchoring member. Through this action, the semi-rigid tab, and the portion of the release liner adhered to it, cooperated such that the semi-rigid tab flipped back onto the portion of the release liner to which the semi-rigid tab was not attached by adhesive. This action exposed a first portion, but only the first portion, of the adhesive of the first adhesive-backed anchoring member. The exposed first portion included the wound edge and an adjacent area enabling the practitioner to apply a portion of the adhesive-backed anchoring member to the skin. Because a second portion of the first adhesive-backed anchoring member remained protected by the release liner and flipped back semi-rigid tab, a practitioner was able to hold this protected second portion to manipulate and precisely apply the first adhesive-backed anchoring member with gloved fingers.

This precise application was enhanced by the semi-rigid nature of the semi-rigid tab. For example, a practitioner could bend, or bow, the semi-rigid tab thereby limiting the initial adhesive contact at the wound edge to a central portion of the wound edge. When properly positioned, the exposed first portion of the first adhesive-backed anchoring member was fully adhered to the skin by pressing down the exposed first portion and releasing the bend from the semi-rigid tab. Subsequently, by gripping and pulling the semi-rigid tab adjacent the adhered first portion of the adhesive-backed anchoring member, the remaining second adhered portion of the release liner was removed exposing the remaining adhesive of the first adhesive-backed anchoring member which was then pressed down and fully adhered to the skin. This process was then repeated with the second adhesive-backed anchoring member. Following attachment of both adhesive-backed anchoring members, the wound or incision was closed according, for example, to the teachings of the referenced US patents.

SUMMARY

The present disclosure relates to a two-component medical device for closing a wound or incision. The two-component medical device comprises a first component comprising a first adhesive-backed anchoring member having one edge referred to as a wound edge of the first adhesive-backed anchoring member, one or more first elongated connectors extending from the wound edge of the first adhesive-backed anchoring member and one or more first pulling elements joined to the one or more first elongated connectors and adapted for translation of the first adhesive-backed anchoring member toward a wound or incision. The two-component medical device also comprises a second component comprising a second adhesive-backed anchoring member having one edge referred to as the wound edge of the second adhesive-backed anchoring member, one or more second elongated connectors extending from the wound edge of the second adhesive-backed anchoring member and one or more second pulling elements joined to the one or more second elongated connectors and adapted for translation of the second adhesive-backed anchoring member toward the wound or incision. The two-component medical device also comprises a first and a second release liner protecting the adhesive-backed surface of the first adhesive-backed anchoring member, each of the first and second release liners of the first adhesive-backed anchoring member having a tab portion for removal of the associated first or second release liner of the first adhesive-backed anchoring member. The two-component medical device also comprises a first and a second release liner protecting the adhesive-backed surface of the second adhesive-backed anchoring member, each of the first and second release liners of the second adhesive-backed anchoring member having a tab portion for removal of the associated first or second release liner of the second adhesive-backed anchoring member. The two-component medical device also comprises means for attaching the one or more first elongated connectors to the second adhesive-backed anchoring member thereby forming an attached portion and a bridging portion for each attached first elongated connector. The two-component medical device also comprises means for attaching the one or more second elongated connectors to the first adhesive-backed anchoring member thereby forming an attached portion and a bridging portion for each attached second elongated connector.

In other embodiments, the disclosure relates to a two-component medical device as described above wherein the tabs are unadhered portions of the stock used to produce the first and second release liners associated with the first or second adhesive-backed anchoring members, or are produced from separate stock and attached to the first and second release liners associated with the first or second adhesive-backed anchoring members.

In other embodiments, the disclosure relates to a two-component medical device as described above wherein the tab extends beyond the adhesive-backed portion of the associated first or second adhesive-backed anchoring member.

In other embodiments, the disclosure relates to a two-component medical device as described above wherein adhered portions of each of the first and second release liners protecting the adhesive-backed surface of the first adhesive backed anchoring member, and adhered portions of each of the first and second release liners protecting the adhesive-backed surface of the second adhesive backed anchoring member, have a boundary axis that is parallel with the wound edge of the associated adhesive-backed anchoring member from which a tab portion extends, wherein each boundary axis defines a boundary of an adhered portion.

In other embodiments, the disclosure relates to a two-component medical device as described above wherein the tab portion of the first release liner protecting the first adhesive-backed anchoring member, and the tab portion of the second release liner protecting the first adhesive-backed anchoring member, define a first and second line segment at their points of extension from their respective boundary axis, and the first and second line segments are substantially parallel and adjacent; and the tab portion of the first release liner protecting the second adhesive-backed anchoring member, and the tab portion of the second release liner protecting the second adhesive-backed anchoring member, define a first and second line segment at their points of extension from their respective boundary axis, and the first and second line segments are substantially parallel and adjacent.

In other embodiments, the disclosure relates to a two-component medical device as described above wherein the first and second line segments of element a) have a length substantially equivalent to the length of the boundary axis of the first and second release liners that are adhered to the first adhesive-backed anchoring member; and the first and second line segments of element b) have a length substantially equivalent to the length of the boundary axis of the first and second release liners that are adhered to the second adhesive-backed anchoring member.

In other embodiments, the disclosure relates to a two-component medical device as described above wherein the first release liner protecting the adhesive-backed surface of the first adhesive-backed anchoring member, and the first release liner protecting the adhesive-backed surface of the second adhesive-backed anchoring member, overlap or abut, and are physically connected through the use of adhesive.

In other embodiments, the disclosure relates to a two-component medical device as described above wherein the tab portion of the first release liner protecting the adhesive-backed portion of the first adhesive-backed anchoring member, and the tab portion of the first release liner protecting the adhesive-backed portion of the second adhesive-backed anchoring member extends from the portion of the release liner protecting the wound edge.

In other embodiments, the disclosure relates to a two-component medical device wherein the first release liner protecting the adhesive-backed surface of the first adhesive-backed anchoring member, and the first release liner protecting the adhesive-backed surface of the second adhesive-backed anchoring member, are produced from a single polymer sheet divided into two zones.

In other embodiments, the disclosure relates to a two-component medical device as described above wherein the two zones are divided by a frangible line formed within the single polymer sheet.

In other embodiments, the disclosure relates to a two-component medical device as described above wherein the two zones are divided by a crease formed within the single polymer sheet.

In other embodiments, the disclosure relates to a two-component medical device as described above wherein first and second adhesive-backed anchoring members are produced from transparent stock.

In other embodiments, the disclosure relates to a two-component medical device as described above wherein first and second adhesive-backed anchoring members are produced from inelastic stock, or from elastic stock reinforced with an inelastic structural material.

In other embodiments, the disclosure relates to a two-component medical device as described above wherein first and second adhesive-backed anchoring members are produced from a vapor-permeable stock.

In other embodiments, the disclosure relates to a two-component medical device as described above wherein the pulling elements and/or anchoring members are coded to enable user distinction.

In other embodiments, the disclosure relates to a two-component medical device as described above wherein the coding comprises an observable geometric distinction.

In other embodiments, the disclosure relates to a two-component medical device as described above wherein the coding comprises printed indicia.

In other embodiments, the disclosure relates to a two-component medical device as described above wherein the coding comprises distinguishing colors.

In other embodiments, the disclosure relates to a two-component medical device as described above wherein pulling elements are removable following application of the device.

In other embodiments, the disclosure relates to a two-component medical device as described above wherein pulling elements are reinforced with a pull bar.

In other embodiments, the disclosure relates to a two-component medical device as described above wherein the means for attaching the one or more first and second elongated connectors to the second and first adhesive-backed anchoring member during closure comprises adhesive.

In other embodiments, the disclosure relates to a two-component medical device as described above wherein the adhesive is provided on the lower surfaces of the first and second elongated connectors.

In other embodiments, the disclosure relates to a two-component medical device as described above wherein the release liners are optionally coded to indicate sequence of removal.

In other embodiments, the disclosure relates to a two-component medical device as described above wherein the coding comprises printed indicia enabling user distinction between the first and second release liner.

In other embodiments, the disclosure relates to a two-component medical device as described above wherein the coding comprises distinguishing colors between the first release liner and the second release liner.

In other embodiments, the disclosure relates to a two-component medical device as described above wherein the first and second adhesive-backed anchoring members are provided with one or more alignment indicators.

In other embodiments, the disclosure relates to a two-component medical device as described above wherein the first and second adhesive-backed anchoring members are provided with a wound edge bar.

In other embodiments, the disclosure relates to a two-component medical device as described above wherein the edges of the first and second adhesive-backed anchoring members adjacent the wound or incision are curved or angled to evert the skin edges.

In other embodiments, the disclosure relates to a two-component medical device as described above wherein a portion of the first and second elongated connectors is cut away to increase unobstructed surface area above the wound or incision thereby facilitating drainage of exudates and application of medication.

In other embodiments, the disclosure relates to a two-component medical device as described above wherein the elongated connectors are sufficiently spaced-apart to facilitate lateral adjustment of the first elongated component relative to the second elongated component.

In other embodiments, the disclosure relates to a two-component medical device as described above wherein the first and second adhesive-backed anchoring members are produced from an elastic polymeric material not reinforced with an inelastic structural material.

In other embodiments, the disclosure relates to a two-component medical device as described above wherein the first and second adhesive-backed anchoring members are made from inelastic material that is altered by mechanical manipulation.

In other embodiments, the disclosure relates to a two-component medical device as described above wherein the first and second elongated connectors are strap-like such that the width of each is greater than the thickness of each.

In other embodiments, the disclosure relates to a two-component medical device as described above wherein the attachment of the first and second elongated connectors to the second and first adhesive-backed anchoring members forms an attached portion and a bridging portion for each individual elongated connector, wherein the average width of the bridging portion of each elongated connector is less than the average width of the attached portion.

In other embodiments, the disclosure relates to a two-component medical device as described above wherein the bridging portions are substantially free of adhesive.

In other embodiments, the disclosure relates to a two-component medical device as described above wherein the first and second adhesive-backed anchoring members are perforated or slit in a direction generally perpendicular to their respective wound edges thereby facilitating removal of a portion of the device thereby reducing the size of the device or creating multiple devices.

In other embodiments, the disclosure relates to a two-component medical device as described above wherein the device contains embedded infection indicators useful for detecting the development of infection.

In other embodiments, the disclosure relates to a two-component medical device as described above wherein the device is adapted for transdermal drug delivery.

In other embodiments, the disclosure relates to a two-component medical device as described above wherein the device comprises an elastic tension indicator element.

In other embodiments, the disclosure relates to a two-component medical device as described above wherein the first elongated component and the second elongated component, or elements thereof, are die cut from sheet stock.

In other embodiments, the disclosure relates to a two-component medical device as described above wherein the first and second elongated components are interlaced.

In other embodiments, the disclosure relates to a two-component medical device as described above wherein the first and second elongated components are mated in a keyhole arrangement.

In other embodiments, the disclosure relates to a two-component medical device as described above wherein the width of the attached portions is constant.

In other embodiments, the disclosure relates to a two-component medical device as described above wherein at least the first and second adhesive-backed anchoring members are produced from colored or opaque stock.

In other embodiments, the disclosure relates to a two-component medical device as described above wherein the mechanical manipulation comprises the introduction of discontinuities selected from the group consisting of slices, perforations or punches.

In other embodiments, the disclosure relates to a two-component medical device as described above wherein the mechanical manipulation increases breathability of the material.

In other embodiments, the disclosure relates to a two-component medical device as described above wherein the mechanical manipulations facilitate transfer of sweat from the skin beneath the first and second adhesive-backed anchoring members when in use.

In other embodiments, the disclosure relates to a two-component medical device as described above wherein the mechanical manipulation results in elastic-like properties.

In other embodiments, the disclosure relates to a two-component medical device as described above wherein the mechanical manipulation comprises the introduction of slits in adhesive-backed anchoring members thereby creating a plurality of adhering subdomains.

DETAILED DESCRIPTION

Figure 1:
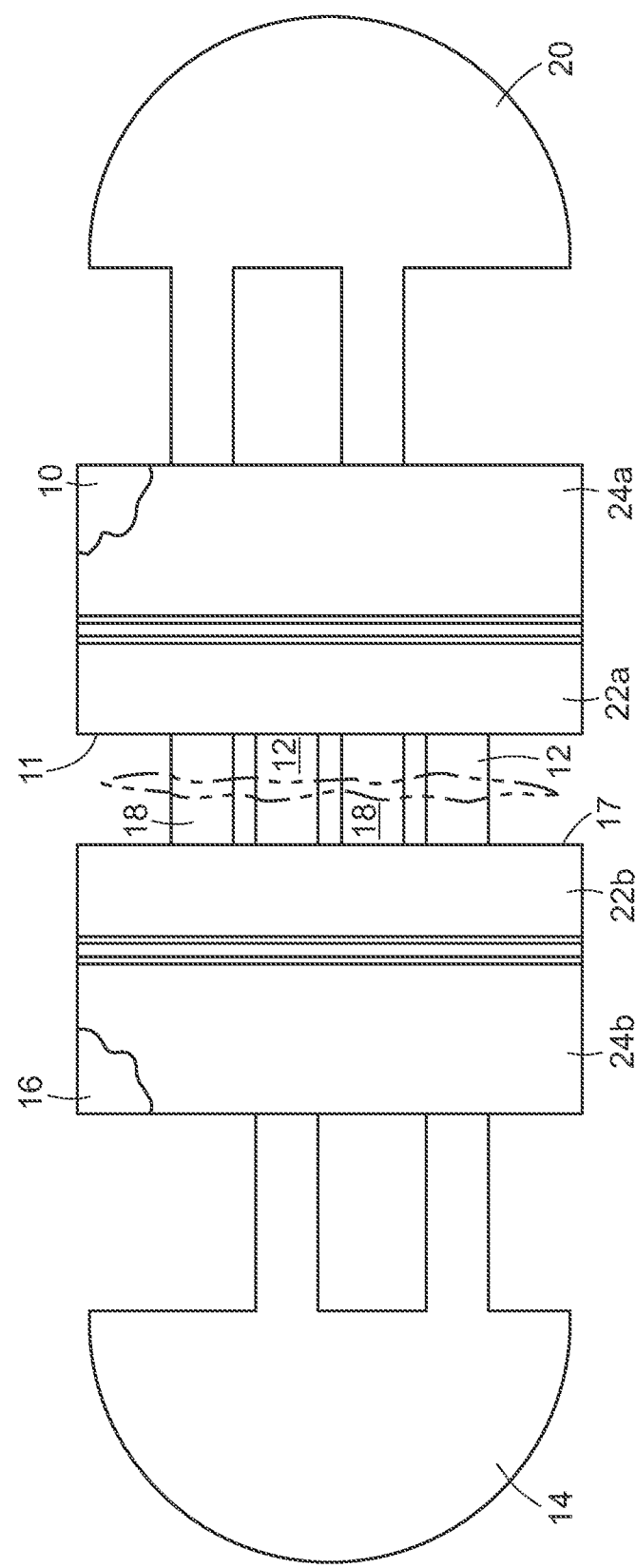
FIG. 1 is a bottom projection view of an interlaced wound closer device of the present disclosure.

The present disclosure relates to a two-component medical device useful for closing a wound or incision. Embodiments of the two-component medical device include a first component including a first adhesive-backed anchoring member having one edge referred to as a wound edge of the first adhesive-backed anchoring member. The first component also includes one or more first elongated connectors extending from the wound edge of the first adhesive-backed anchoring member and one or more first pulling elements joined to the one or more first elongated connectors and adapted for translation of the first adhesive-backed anchoring member toward a wound or incision.

Embodiments also include a second component including a second adhesive-backed anchoring member having one edge referred to as a wound edge of the second adhesive-backed anchoring member. The second component also includes one or more second elongated connectors extending from the wound edge of the second adhesive-backed anchoring member and one or more second pulling elements joined to the one or more second elongated connectors and adapted for translation of the second adhesive-backed anchoring member toward the wound or incision.

Embodiments also include a first and a second release liner protecting the adhesive-backed surface of the first adhesive-backed anchoring member. Each of the first and second release liners of the first adhesive-backed anchoring member include a tab portion for removal of the associated first or second release liner of the first adhesive-backed anchoring member.

Embodiments further include a first and a second release liner protecting the adhesive-backed surface of the second adhesive-backed anchoring member. Each of the first and second release liners of the second adhesive-backed anchoring member include a tab portion for removal of the associated first or second release liner of the second adhesive-backed anchoring member.

Means are provided for attaching the one or more first elongated connectors to the second adhesive-backed anchoring member thereby forming an attached portion and a bridging portion for each attached first elongated connector. Means are also provided for attaching the one or more second elongated connectors to the first adhesive-backed anchoring member thereby forming an attached portion and a bridging portion for each attached second elongated connector.

As discussed above, each of the adhesive-backed surfaces of both the first and second adhesive-backed anchoring members are protected by a first and a second release liner. Tabs are provided on each of the first and second release liners to facilitate removal and application of the two-component medical device. Specific embodiments of release liner combinations will be discussed in detail below. Prior to describing these embodiments in detail, certain considerations common to all embodiments will be discussed.

Interlaced and Keyhole Embodiments

Embodiments of the medical device of the present disclosure can be interlaced or non-interlaced. Interlaced embodiments are those wherein both the first and second components comprise two or more elongated connectors, wherein the first and second elongated connectors of the first component are attached to a single pulling element and the first and second elongated connectors of the second component are attached to another single pulling element. Further, an elongated connector from one of the two components passes through the void formed between the two elongated connectors of the other component. When assembled in this manner, the first and second components are linked and they cannot be separated without cutting or breaking at least one of the two components. A simple analogy to such an interlaced device is a pair of interlocking rings.

One of skill in the art will recognize that more complex interlaced embodiments can be produced wherein, referring to a first component, interlacing extends to two or more adjacent voids formed by three or more adjacent elongated connectors. Examples of such embodiments are provided in the disclosures in issued US patents referenced and incorporated by reference in the Background section.

Interlaced embodiments can be produced in a variety of ways. Consider, for example, the simplest embodiment to which the analogy to interlocking rings has been made. To produce such an interlaced structure, the first and second components can be die cut as monolithic elements. One of the two components can then be cut, interlaced with the uncut component, and the cut can then be repaired, for example, with adhesive or some other appropriate means. As an alternative method for producing the simplest interlaced embodiment, one component can be die cut monolithically, and the second component can be die cut with an element, or a portion of an element missing. For example, the second component could be die cut with one of the two required elongated connectors being absent. The missing second elongated connector could be provided as a separate die cut element, complete with adhesive. Following interlacing of the first component with the partial second component, the interlaced structure could be completed by attaching the separately supplied missing elongated connector.

Neither of the interlaced device production methods discussed above is adaptable to a computer-controlled, mass production, manufacturing technique. Such methods have, however, been developed, publicly disclosed and incorporated herein by reference. Given this disclosure, one of skill in the art can develop and implement computer-controlled methods for production of interlaced embodiments of the two component medical device of the present disclosure.

A non-interlaced alternative design has been referred to as the "key-hole" design. In this design, for example, the two components of the two-component medical device are separately produced. In a preferred method, they are produced through a die cut process as monolithic components. Each of the two monolithic components comprise a adhesive-backed anchoring member, elongated connector(s) and a pulling element. The elongated connector(s) of the first component are centrally located in the assembled and applied device. The elongated connectors of the second component are spaced apart thereby creating a void, or "key-hole" through which the pulling element and elongated connector(s) of the first element are inserted. Following insertion and rotation of the first and second components into a common plane, the two components are mated in a "key-hole" arrangement and the two-component device is in condition for application.

Sheet Stock

In preferred embodiments, the adhesive-backed anchoring members, elongated connectors and pulling elements are produced from a substantially inelastic polymeric material. Alternatively, they may be produced from an elastic material which is reinforced with an inelastic structural component thereby rendering the device substantially inelastic. For example, such inelastic materials may include monofilament polymeric line or mesh. Such reinforced polymers are referred to herein as polymeric composites. A reinforcing, inelastic structural material is referred to in the art as "scrim". Scrim may be a woven textile or polymer, a non-woven polymer, or any other structural material that acts to stabilize the substrate. Preferably, the scrim reinforced substrate will have a high degree of permeability (e.g., 1,000 to 8,000 liters/sec/m$^2$).

Additionally, non-reinforced polymers exhibiting a degree of elasticity (e.g., polyurethane or polyester) may be used in the production of adhesive-backed anchoring members for embodiments in which adhesive-backed anchoring members and elongated connectors are produced separately, and subsequently attached to one another (i.e., non-monolithic embodiments). A preferred polymer for the production of the adhesive-backed anchoring members is polyurethane having a thickness of 3-12 mils. Such a polymer is breathable and exhibits a degree of flexibility. If a non-reinforced elastic polymer is used to produce an adhesive-backed anchoring member, it will be preferable to reinforce the upper surface of the wound edge with an inelastic element so that the wound edge remains substantially straight across the incision site during the closure process. Such an element is referred to herein as a "wound edge bar". One skilled in the art will recognize that a wide range of inelastic polymers, or even metals, can be utilized in the production of a wound edge bar for the purpose of providing rigidity to the wound edge. Vapor permeable polymeric materials that satisfy the other requirements for use in the manufacturing of the device offer improved comfort and are preferred. Transparent stock is also preferred so that the healing process and the entire wound site can be monitored easily. Therefore, at least the first and second adhesive-backed anchoring members are produced from transparent stock in preferred embodiments. As an alternative design choice, colored or opaque stock may be used in the production of at least the first and second adhesive-backed anchoring members when circumstances (e.g., cost considerations) dictate.

In preferred embodiments, the adhesive-backed anchoring members, elongated connectors and pulling elements are produced from sheets or rolls of polymeric material or polymeric composite material (e.g., polyurethane or polyester). The sheet or roll stock is typically referred to as "film" as the thickness in preferred embodiments ranges from about 0.5 mil to about 5 mil, and may vary depending upon application. Die cutting these elements from polymeric sheet stock to provide two monolithic components (i.e., having no seams or joints) which, when assembled/packaged comprise the two-component device, is a particularly cost-effective approach to manufacturing. Die cutting can be combined with other assembly steps, for example, in connection with the production of interlaced embodiments as discussed elsewhere herein. Laser and ultrasonic trimming devices are also examples of equipment that can be used to cut the components of the present disclosure. The sheet stock may be perforated to allow for the exchange of air with the skin beneath the two-component device.

Mechanical Manipulation of Sheet Stock

The subject disclosure relates to improvements and modifications in polymeric films that comprise the adhesive-backed anchoring members of the two-component medical devices. More particularly, instances of the present disclosure include a first and second adhesive-backed anchoring member characterized by the presence of one or more discontinuities in the polymeric film allowing for the release of sweat from beneath the first and second adhesive-backed anchoring members. The use of an inherently breathable polymeric film (i.e., a polymeric film, that without any mechanical manipulation, allows for the exchange of air with the skin beneath the first and second adhesive-backed anchoring members) for the production of the first and second adhesive-backed anchoring members does not allow for the release of sweat.

Certain mechanical manipulation of an inherently breathable polymeric film that does not allow for the release of sweat will permit sweat to pass from the skin beneath the wound closure device. The same can be said for mechanical manipulation of a polymeric film that is not inherently breathable.

The introduction of discontinuities that do allow for the release of sweat from beneath the first and second adhesive-backed anchoring members addresses the problem of adhesion loss. There is variability in the size, number and distribution of active sweat glands in humans. For example, according to one expert estimate, the palm of the hand has about 370 sweat glands per $cm^2$. By comparison, the back of the hand has about 200; the forehead has about 175; the breast, abdomen and forearm have about 155; and the leg and back have about 60-80 (all expressed in sweat glands per $cm^2$). Given this sweat gland distribution pattern, one skilled in the art will recognize that discontinuities should be introduced broadly, across the area of the adhesive-backed anchoring members, to be most effective in addressing the problem of adhesion loss.

Discontinuities can be introduced into the polymeric material used to produce the first and second adhesive-backed anchoring members in a variety of ways. It is not a requirement that all discontinuities introduced into a particular adhesive-backed anchoring member be homogenous or uniform. Die cutting technology is a preferred method for the introduction of discontinuities. Die cutting is a process involving the use of a die to shear a web or webs of low-strength materials such as polymeric sheet materials. For example, a needle or pin die could be used to introduce a hundreds, or even thousands of small, round discontinuities into the first and second adhesive-backed anchoring members through a perforation process. Perforation, as used herein, refers to a process wherein a discrete piercing element, such as a pin in an array of pins assembled on a die, penetrates a material leaving no excess material on either side (e.g., entry or exit side). Whether penetration by a particular piercing element leaves excess material on one side or another (e.g., deformation of material on the exit side) depends not solely on the piercing element, but also the material being pierced (in this case a polymeric sheet material). For example, a larger gauge piercing element, the size of a small nail, for example, may create exit deformation in some polymeric sheet stocks that would not be useful for the introduction of discontinuities consistent with the present disclosure. The shape of a piercing element need not be round. There are no geometric restrictions on the shape of a piercing element.

For the introduction of larger discontinuities, like those produced by piercing a polymeric material with a small nail, a punch process may be more appropriate. A punch, as used herein, is contrasted from a perforation by the requirement that material is removed in a punch process. For example, a punch die of a particular diameter would punch, or remove, a chad from the polymeric material. Such loose chads are removed in a variety of ways in a die cutting process including, for example, inclusion of an adhesive web to capture cut chads, or a vacuum process.

In addition to perforation or punching, as described above, cutting (e.g., die cutting) can be used to introduce one or more slits or slices into the adhesive-backed anchoring members. Again, in view of the sweat gland distribution discussed above, a plurality of slits will be preferred.

One of skill in the art will recognize that a certain amount of routine experimentation may be required to optimize discontinuity size, shape and distribution. Certain larger gauge perforations, punches or slits will allow for the transfer of sweat from the skin beneath the wound closure device. Certain smaller gauge perforations, produced for example using a pin die as discussed above, may allow for vapor transfer but not sweat transfer. It is a matter of routine experimentation to determine discontinuity parameters that will allow for sweat transfer. Optimal discontinuity design for one specific polymer sheet, backed with one specific adhesive, may not work well using a different polymer sheet and/or different adhesive. A particularly soft or gummy adhesive, for example, may function in a self-healing role by flowing in to fill perforations when such perforations are introduced with a particularly small diameter piercing element.

It will also be recognized by one of skill in the art that punch-type discontinuities will tend to remove skin contact surface area (and adhesive) from an adhesive-backed anchoring member. For this reason, larger punch-type discontinuities (e.g., paper punch size discontinuities, or larger) are not favored, at least for applications requiring high adhesion characteristics.

For a variety of reasons, slits or slices introduced into the adhesive-backed anchoring members are preferred. For one, like perforations, slits or slices do not remove material from the adhesive-backed anchoring members and, therefore, the adhesive-backed anchoring members retain their full surface area and adhesive content following the introduction of the slits or slices. Slits or slices can be straight or curvilinear and the slits or slices can be relatively long (e.g. running the length or width of an adhesive-backed anchoring member) or generally short in length. Furthermore, under flexion, a slit or slice will tend to open up. This tendency serves at least two purposes that represent advantages in the context of a two-component wound closure device. First, the "opening up" of a slit or slice under flexion enables relative unimpeded transfer of sweat from the surface of the skin beneath the adhesive-backed anchoring member to the external environment. Second, the "opening up" of the slit or slice tends to allow the adhesive-backed surfaces adjacent to the slit or slice to remain in good adherence with the skin. The presence of the slit or slice tends to reduce peel or shear forces that tend to result in poor adherence characteristics.

In preferred instances, slits are introduced into each adhesive-backed anchoring members in a direction generally perpendicular to the wound edge of the adhesive-backed anchoring member. The slits are positioned so that they will fall between elongated connectors in an applied device. Slits oriented in this way tend to allow a particular adhesive-backed anchoring member to be viewed as a unit having a number of adhering subdomains, with the adhering subdomains being divided by the introduced slits. The adhered two-component device opens in an accordion-like manner under flexion. In instances of the two-component device disclosed, the adhering subdomains can actually separate from one another over time thereby creating independent subdomains.

Mechanical manipulation of the type described above can provide for "elastic-like" properties in non-elastic polymers. Although the mechanical manipulation does not change the non-elastic characteristic of the particular polymer, the introduction of voids or discontinuities can allow for movement or dimensional flexion when compared to an otherwise identical polymer lacking voids or discontinuities.

Application Considerations

The use of the device to close a laceration or incision will be discussed in greater detail below, however, a brief orientation at this stage in the discussion is helpful. In use, the adhesive-backed anchoring member of the first component of the device is applied to the skin of the animal or human patient adjacent to the laceration or incision to be closed. The wound edge of the first component is placed very near to the edge of the laceration or incision, but not so close as to introduce adhesive from the first component anchoring member into the open area of the laceration or incision. The one or more elongated connectors extend from the wound edge of the anchoring member of the first component, in a direction which is generally perpendicular to the wound edge, and extend across the area of a laceration or incision to the opposite side of the laceration.

A similar application procedure is followed for application of the second component, the procedure for the application of the second being the mirror image of the procedure for application of the first. Following application of the adhesive-backed anchoring members, the laceration is closed by either pushing anchoring members toward one another, or by pulling them together by grasping one or more elongated connectors from each component and pulling the laceration closed. Very fine adjustment can be made in the X and Y dimension ensuring laceration closure with minimal scarring. When the first and second component are positioned to the satisfaction of the physician, or other individual applying the device, the relationship of the two components is fixed by attaching the one or more elongated connectors of the first component to the anchoring member of the second component, and by attaching the one or more second elongated connectors of the second component to the anchoring member of the first component.

Adhesives

The adhesives selected for use in connection with the present disclosure must meet a number of requirements. First, adhesive which is to come into contact with the skin must be selected to minimize the potential for adverse reaction by the skin. That is, the adhesive selected should be hypoallergenic. Additionally, all adhesives, whether or not they are intended to contact the skin, must provide a secure hold for a period of time sufficient for the healing process to progress to the point where removal of the device is appropriate. An adhesive hold period of about 7-10 days is generally suitable.

Adhesive is a preferred means of attaching one or more elongated connectors to a adhesive-backed anchoring member. In one embodiment, adhesive is applied to at least a portion of the lower surface of the elongated connectors for attaching the elongated connectors of one of the two components to the applied anchoring member of the other component. Alternatively, or additionally, adhesive may be applied to a portion of the upper surfaces of the first and second adhesive-backed anchoring members. Release liners are used to protect applied adhesives prior to application of the device.

The elongated connectors have two parts or portions, an attached portion and a bridging portion. The attached portion of the elongated connectors, as the name indicates, is that portion which is attached to the anchoring member of the opposing component following application of the device. The bridging portion is the portion of the elongated connector or members which spans the over-laceration area. In further refined embodiments, the lower surface of the bridging portion contains less adhesive than the attached portion. In preferred embodiments, the entire bridging portion of the one or more elongated connectors is free of adhesive or, alternately, have adhesive but this is blocked with another film (kill layer) to render the adhesive in the bridging portion nonfunctional.

Elongated Connectors

As mentioned above, the dimension of the elongated connectors is strap-like in that their width is substantially greater than their thickness. In light of the fact that the point of attachment between the first and second elongated components is between the underside of attached portions of elongated connectors with the upper surface of attached elongated components, maximizing the area of contact will result in a more secure closure of the device because the area of adhesive contact is maximized. Thus, from the standpoint of security of closure, wider attached portions are preferred. However, as the width of all the elongated connectors is increased, the distance between elongated connectors necessarily is decreased. It is extremely important that there be enough distance between adjacent elongated connectors to facilitate fine adjustment of the device as the second anchoring member is being positioned, and after the two anchoring members are positioned, but prior to fixing their relationship by attaching elongated connectors to anchoring members.

As was stated in U.S. Pat. No. 6,329,564, the disclosure of which is incorporated herein by reference: There is no absolute minimum which can be stated with respect to spacing between elongated connectors. Preferred ranges are probably best stated as a percentage of device length (i.e., the dimension of the device generally parallel the laceration or incision). For example, a spacing of between about 5% to about 10% of the bandage length is an example of an appropriate range.

This spacing provides substantial adhesive contact between attached portions of elongated connectors with anchoring members, as well as sufficient spacing for fine adjustment of both before and following the attachment of the second anchoring member. Fine adjustment made after the attachment of the second anchoring member is generally a concern after the laceration has been closed and just prior to attachment of elongated connectors to an adhesive-backed anchoring member. At this stage in the application process, the bridging portions of the one or more first elongated connectors and the bridging portions of the one or more second elongated connectors are aligned with one another over the closed laceration or incision. In a preferred embodiment of the present disclosure, the average width of the bridging portions is less than the average width of the attached portions of the elongated connectors. Average width is determined by measuring from the outer perimeters of the bridging portions and the outer perimeters of the attached portions.

This difference in width in the bridging portion relative to the attached portion affords advantages over prior art devices in which the width of elongated connectors was substantially constant along their length. Consider, for example, a prior art device designed for maximum security. In such a device, the elongated connectors would be placed as close as possible, while still providing for a minimum acceptable degree of adjustment range. If the bridging area were narrowed in such a device, the net effect would be an increase in exposed area over the laceration (which is desirable for application of medicines, removal of exudates, etc), as well as an increase in the range of adjustment (narrowing the width of the elongated connectors in the bridging portion effectively increases the distance between adjacent bridging portions).

Considering the same prior art device discussed in the preceding paragraph, holding the width of bridging portion constant, while increasing the width of the attached portions provides for greater security as the area of adhesive contact is effectively increased. It will be recognized by one skilled in the art that hybrid configurations (i.e., devices having narrowed bridging portions and widened attached portions relative to prior art, uniform width devices) represent important embodiments of the present disclosure.

Elongated connectors may be viewed as strap-like in their dimensions. In preferred embodiments, a portion of the elongated connectors is cut away to increase the unobstructed surface area over the wound or incision. This tends to facilitate drainage of exudates and application of medication. This cut-out is best produced during the die cut process. U.S. Pat. No. 6,329,564, the disclosure of which is incorporated herein by reference, depicts cut-outs, for example, in FIG. 3. The shape of the cut-out is not critical. What is important is that the structural integrity of the elongated connectors is not compromised by the introduction of the cut-outs.

Pulling Elements

Preferred embodiments of the present disclosure include pulling elements which are attached to elongated connectors, or to extensions of elongated connectors. Extensions of elongated connectors could themselves be considered to be pulling elements in embodiments in which only one elongated connector is associated with a component. By definition, the attached portion of an elongated connector attaches to the anchoring member of another component. Extensions of an elongated connector extend the length of the elongated connector for ease of application, and are generally removed following the application process. Perforations or scoring are preferably provided to facilitate their removal. For embodiments in which the number of elongated connectors associated with a component is greater than one, a pulling element is useful for joining the elongated connectors or extensions of elongated connectors to enable a user to easily apply a pulling force to more than one connecting member.

Removal of the pulling elements minimizes the footprint of the applied two-component device. This decrease in the overall size of the device reduces the chance that a portion of the bandage may be caught, for example, on clothing or a pillow. Such an occurrence could tend to pull the applied device away from the skin thereby causing the wound or incision to open. Minimizing the overall footprint of the applied device also tends to provide for a more comfortable fit.

Eversion Edges

In preferred embodiments, the wound edges of the first and second adhesive-backed anchoring members, are adapted to evert (or raise) skin edges to promote wound healing. It is known in the art that everting, raising or mounding of the skin edges at the wound or incision site prevents wound inversion. One way in which this can be accomplished is to provide a bend at the wound edge. The bend may be angled or arcuate. The adhesive on the lower portion of the adhesive-backed anchoring members is also applied to the wound edge portion. When attached to the skin this eversion edge tends to lift the edges of the skin at the point of closure contact, thereby promoting wound or incision healing.

Coding

To minimize confusion for new users of the device of the present disclosure, the pulling elements and anchoring members may be coded to enable user distinction. Thus, for example, the coding may comprise an observable geometric distinction between the shape of the pulling elements and the shape of the adhesive-backed anchoring members. In another embodiment, such coding may comprise printed indicia to enable user distinction between the components. Colors may also be used to provide this distinguishing function.

Lateral Translation Element

In instances of the present disclosure, both the first and second elongated components of the two-component device of the present disclosure comprise one or more first elongated connectors attached to a single first pulling element. In other instances, one of the first or the second elongated components, but not both, comprise one or more lateral translation elements. In these embodiments, one of the first or the second elongated components comprises one or more lateral translation elements, and the other elongated component comprises a plurality of lateral translation elements, each comprising one or more elongated connectors attached to a single pulling element.

Each lateral translation element is selected from the group consisting of: a) a single elongated connector and a single pulling element; and b) a plurality of elongated connectors and a single pulling element.

Release Liners

The adhesive-backed surfaces of the device of the present disclosure are protected (e.g., from contamination and oxidation) by the application of release liners during the manufacturing process. In some instances, multiple release liners, or release liner systems may be used to protect a single, uninterrupted, adhesive-backed surface. Consider, for example, the anchoring members of the disclosed device. In order to precisely attach the wound edge of an anchoring member adjacent a laceration or incision to be closed, it is preferable to hold the anchoring member with one hand leaving the other hand free to manipulate the laceration or incision area. Thus, a plurality of release liners on each anchoring member is preferred. In preferred embodiments, a first release liner, which protects the wound edge, is removed first during the application process. In this way, a portion of the wound edge can be adhered to the skin while leaving a protected portion of the anchoring member which can be held (e.g., in a gloved hand) without the device adhering to the fingers of the user. Once the wound edge has been applied, the second release liner can be removed to fully secure the anchoring member. Preferred release liner stock includes paper, cardboard or polymeric sheet stock. The use of a plurality of release liners in connection with the adhesive associated with the elongated connectors is less important as extensions of the elongated connectors and pulling elements are provided "adhesive-free" in preferred embodiments. To minimize confusion for new users of the device of the present disclosure, the release liners may also be coded. Release liner colors or printed indicia on the release liner are examples of coding enabling a user to readily identify the order of release liner removal.

As discussed above, the film or sheet stock used to manufacture the first and second components of the device of the present disclosure can be, and preferably are, extremely thin. When applying an anchoring member produced from such thin stock next to a laceration or incision, it is easy to imagine difficulties associated with wrinkling and overlapping of edges, inadvertent or incorrectly positioned initial contact, etc. The release liners employed in connection with the device can provide substantial aid in working with the device, particularly a device produced from thin sheet stock, if properly selected. For example, if two release liners are used to protect the adhesive-backed surface of an anchoring member, the characteristics of the release liner protecting the wound edge of the anchoring member is far less important than the characteristics of the later-removed, second release liner protecting the adhesive-backed anchoring member. If, for example, a semi-rigid second release liner is employed, this will enable more precise placement of the wound edge of the adhesive-backed anchoring member.

Alternative Stock

The embodiments of the device discussed above comprise first and second components which are monolithic in nature.

That is, the first component (which includes an anchoring member and one or more elongated connectors) is produced from a single sheet of stock material without joints or seams. The same statement applies to the second component. In an alternative embodiment, the first and second components are not monolithic in nature. This alternative embodiment is based on the recognition that the desired physical properties of the anchoring members and the elongated connectors are not, in every instance, identical. For example, a degree of elasticity is a desirable feature in an anchoring member when applied, for example, to an area such as a joint. An anchoring member produced from a film having a degree of elasticity is less likely to release prematurely than an anchoring member produced from a substantially inelastic material when applied to such an area. Elasticity is a property to be avoided when producing elongated connectors. Any stretching of elongated connectors is to be avoided as this will tend to allow premature opening of a laceration or incision.

In embodiments in which the first and second components are not monolithic, anchoring members may be produced from stock having a degree of elasticity. Elongated connectors are produced separately from stock which is substantially inelastic. One or more first elongated connectors are then attached (e.g., with adhesive) to a first anchoring member to produce a first component. A second component is similarly constructed. As discussed elsewhere, a wound edge bar may be attached to reinforce the wound edge, particularly in embodiments wherein the sheet stock employed has a degree of elasticity.

It is not a requirement that elongated connectors and anchoring members of non-monolithic components be produced from different stock material. It may be desirable, for example, to create an overlap in a portion of the elongated connectors (e.g., the bridging portion) in order to provide for additional strength. Thus, double-thickness in the bridging area may be provided by producing a monolithic anchoring member including a portion of connecting member. A separately produced elongated connector is then attached, in an overlapping manner, to the monolithic anchoring member. This creates a first component which is double-thick in the bridging portion for additional strength and further eliminates stretching.

Reinforcing Elements

It may be desirable to reinforce the wound edge portion of the anchoring member with another layer of less flexible stock. This "wound edge bar" would provide better translation of the force applied by the elongated connectors uniformly along the entire wound edge. Similarly, it may be desirable to reinforce the optional pulling element, or a portion thereof, with another layer of less flexible stock. This "pull bar" would be useful in applying uniform tension from the pulling element to all elongated connectors, as the device is positioned for closure. This feature would become more important in embodiments of the device intended to close long lacerations or incisions where there might be up to four or more elongated connectors to be pulled and secured to each adhesive-backed anchoring member.

Elastic Tension Indicators

The bandage of the present disclosure may optionally include an elastic tension indicator element. The purpose of the tension indicator element is to provide a visual indication that a desired tension has been reached while applying the bandage. For example, materials are known in the art which change color when a predetermined tension is applied. Similarly, other graphic representations may be used for this purpose. For example, a rectangular graphic representation may be applied to an elastic tension indicator element. As this tension indicator is stretched, the graphic representation of the rectangle stretches. This element may be designed such that the desired tension is indicated when the original rectangular representation is stretched to the point where it closely approximates a geometric square.

It is desirable that this elastic tension indicator element be removable with the pulling elements following application of the bandage. At a minimum, the elastic tension indicator element should be positioned in the bandage such that when the bandage is applied, it is not possible for the elastic element to continue to stretch and release the desired tension previously established.

Transdermal Drug Delivery

The two-component device of the present disclosure can be optionally adapted for transdermal drug delivery. As is known in the art, a drug is deliverable transdermally through the skin. For such an application, a drug-containing patch is secured to at least one of the adhesive-backed anchoring members in such a way that the drug can be delivered through the skin. Given the fact that there will be no adhesive contact between the skin and the adhesive-backed anchoring member in the area of the drug delivery patch, it may be necessary to increase the size of the adhesive-backed anchoring member to secure the bandage in such a transdermal drug delivery embodiment. Transdermal drug delivery is well known in the art and a review of the background is not necessary to enable one of skill in the art to make and use embodiments of the present disclosure.

Embedded Infection Indicators

The use of embedded infection indicators represents a relatively new technology that can be incorporated to provide for a wound closure device that can, for example, change color as an indication of the presence of unwanted bacteria. One technology utilizes the release of a fluorescent dye from nanocapsules, the release being triggered by toxins secreted by the unwanted bacteria.

Methods of Use

The present disclosure also relates to methods for closing a laceration or incision using a device of the type described above. Such methods include the steps of applying the anchoring member of a first and second component on opposing sides of a laceration or incision to be closed. The laceration is then closed by the user either by pushing the edges of the laceration together by manipulating the skin in the area of the adhesive-backed anchoring members, by pulling the laceration closed using lateral translation elements, or by some combination thereof. Once the laceration is closed, the position of the first and second component relative to each other is fixed by attaching the elongated connectors to the adhesive-backed anchoring members.

Having discussed above considerations common to all embodiments, following is a description of dual split liner instances of the present disclosure. While drawings and discussion may relate to interlaced instances of the present disclosure, the teachings of the present disclosure relate to all instances of the present disclosure, including non-interlaced instances.

FIG. 1 is a bottom projection view of an interlaced wound closure device of the present disclosure showing selected elements. Elements depicted include first adhesive-backed anchoring member 10 having a wound edge 11, first elongated connectors 12, first pulling element 14, second adhesive-backed anchoring member 16 having a wound edge 17, second elongated connectors 18 and second pulling element 20. Adhesive-backed portions of first adhesive-backed anchoring member 10 are protected by first release liner 22*a* and second release liner 24*a*. Similarly, adhesive-backed portions of second adhesive-backed anchoring member 16 are protected by first release liner 22b and second release liner 24b.

Figure 2:
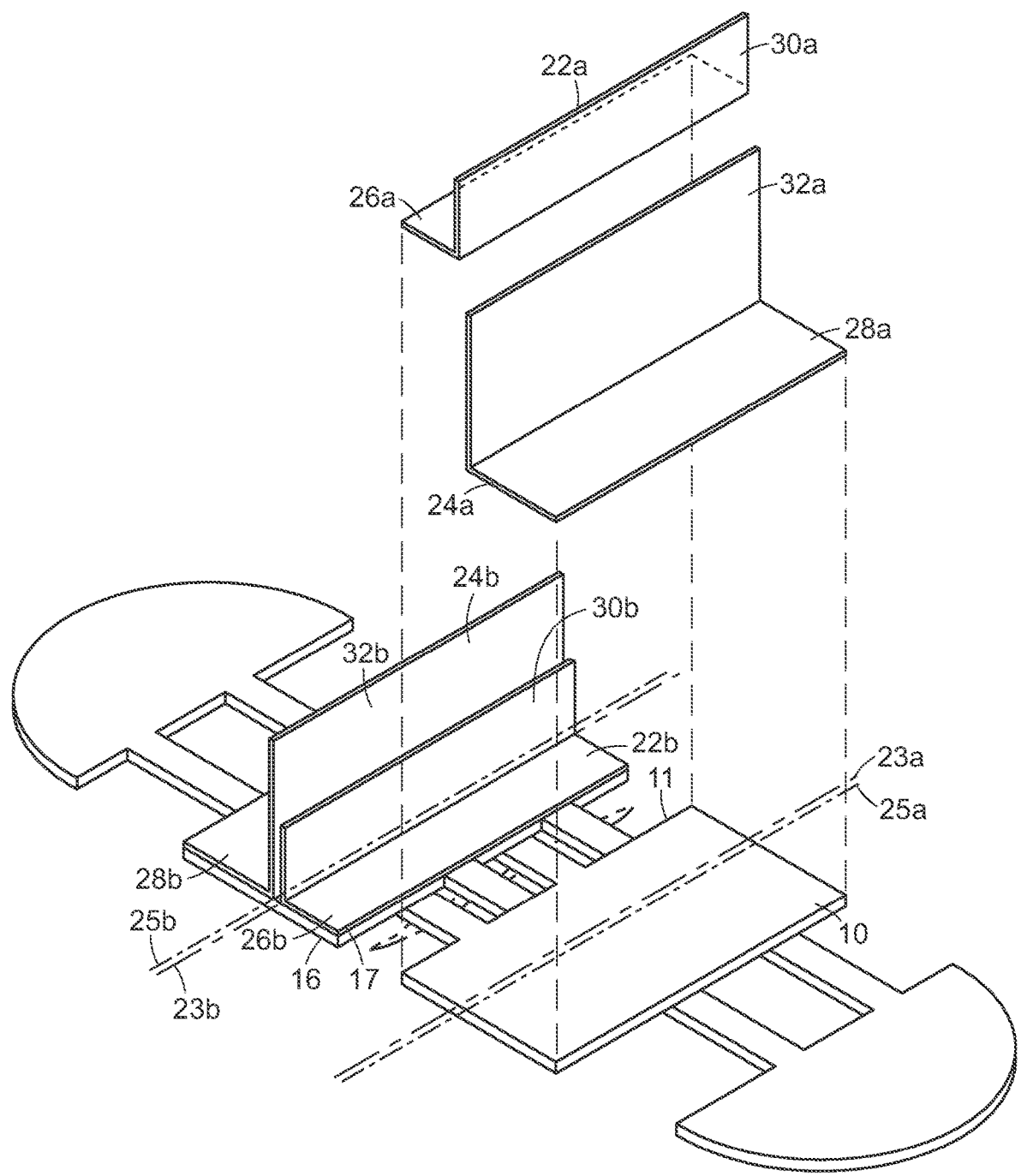
FIG. 2 is a perspective view of an interlaced wound closure device of the present disclosure showing a first adhesive-backed anchoring member protected by a first release liner and a second release liner. A second adhesive-backed anchoring member is shown with a mirror image release liner configuration including a first release liner and a second release liner.

FIG. 2 is a perspective view of an interlaced wound closure device of the present disclosure showing the first adhesive-backed anchoring member 10 protected by first release liner 22a and second release liner 24a. Second adhesive-backed anchoring member 16 is shown with a mirror image release liner configuration including first release liner 22b and second release liner 24b.

Each of release liners 22a and 24a as shown in FIG. 2 include an adhered portion (or protecting portion) in contact with and protecting an adhesive backed portion of first adhesive-backed anchoring member 10. Each of release liners 22b and 24b as shown in FIG. 2 include an adhered portion (or protecting portion) in contact with and protecting an adhesive backed portion of second adhesive-backed anchoring member 16. In FIG. 2, the adhered portion of the first release liner 22a has been assigned reference numeral 26a and the adhered portion of the second release liner 24a has been assigned reference numeral 28a. Similarly, the adhered portion of the first release liner 22b has been assigned reference numeral 26b and the adhered portion of the second release liner 24b has been assigned reference numeral 28b.

Each of the release liners shown in FIGS. 2 (22a, 24a, 22b and 24b) also include an unadhered tab portion that extends beyond the adhesive-backed surfaces and facilitates removal of the associated release liner during application of the device. In FIG. 2, the unadhered tab portion of first release liner 22a has been assigned reference numeral 30a and the unadhered tab portion of second release liner 24a has been assigned reference numeral 32a. Similarly, the unadhered tab portion of first release liner 22b has been assigned reference numeral 30b and the unadhered tab portion of second release liner 24b has been assigned reference numeral 32b. Tab portions will be discussed in greater detail elsewhere in the subject disclosure.

Tabs, or tab portions as used herein, can refer to tabs which are continuous with the associated release liner. In other words, they are produced from the same sheet stock, typically in a die cut process. Alternatively, a tab can be produced from separate stock material and attached to the release liner that it is associated with, using adhesive, for example.

As shown in FIG. 2, first adhesive-backed anchoring member 10 has a boundary axis 23a that is parallel with wound edge 11. Similarly, second adhesive-backed anchoring member 16 has a boundary axis 23b that is parallel with wound edge 17. FIG. 2 also shows that first adhesive-backed anchoring member 10 has a boundary axis 25a that is parallel with wound edge 11. Similarly, second adhesive-backed anchoring member 16 has a boundary axis 25b that is parallel with wound edge 17. Each boundary axis (23a, 23b, 25a and 25b) defines a boundary of the adhered portion of an individual release liner. More specifically, the boundary defined by each boundary axis is an internal boundary (i.e., a boundary internal to either the first or the second adhesive-backed anchoring member). To be specific, boundary axis 23a defines an internal boundary on first adhesive-backed anchoring member 10 that is protected by adhered portion 26a of first release liner 22a. Boundary axis 25a defines an internal boundary on first adhesive-backed anchoring member 10 that is protected by adhered portion 28a of second release liner 24a. Boundary axis 23b defines an internal boundary on second adhesive-backed anchoring member 16 that is protected by adhered portion 26b of first release liner 22b. Finally, boundary axis 25b defines an internal boundary on second adhesive-backed anchoring member 16 that is protected by adhered portion 28b of second release liner 24b.

As already mentioned, the boundary axes are parallel to a wound edge. Boundary axes 23a and 25a are parallel to wound edge 11, and boundary axes 23b and 25b are parallel to wound edge 17. Additionally, the boundary axes are centrally located on their associated adhesive-backed anchoring member. Furthermore, because the entire adhesive-backed surface of each adhesive-backed anchoring member is completely protected by the pair of release liners, the two boundary axes associated with each adhesive-backed anchoring member must be adjacent (because the entire adhesive-backed portion of each adhesive-backed anchoring member is protected). Another requirement of the two boundary axes associated with each adhesive-backed anchoring member is that they are generally centrally located within the area of the adhesive-backed anchoring member.

Although first adhesive-backed anchoring member 10 and second adhesive-backed anchoring member 16 are substantially identical in instances of this disclosure, it is convenient to think of the first adhesive-backed anchoring member 10 as the first to be applied on a first side of the wound or incision. In this example, and referring to FIG. 2, first release liner 22a is removed to expose the adhesive portion of first adhesive-backed anchoring member 10 protected by adhered portion 26a. The adhered portion 28a of second release liner 24a protects the remaining adhesive of the first adhesive-backed anchoring member 10 and provides a non-sticky gripping area for a medical practitioner to grip the first adhesive-backed anchoring member 10 while aligning the wound edge 11 and precisely adhering exposed adhesive on the portion of the first adhesive-backed anchoring member 10 exposed by removal of adhered portion 26a of first release liner 22a.

Thus, one of skill in the art will recognize that boundary axes 23a and 25a should be positioned centrally within the area of the adhesive-backed portion of first adhesive-backed anchoring member 10. This is important because adhesion prior to removal of second release liner 24a must be secure. If, for example, adhered portion 26a of first adhesive-backed anchoring member 10 represented only 5-10% of the area of the adhesive-backed portion of first adhesive-backed anchoring member 10, there would be a risk that the partially applied first adhesive-backed anchoring member 10 (i.e., that portion applied prior to removal of second release liner 24a) could be pulled loose from the skin during the removal of second release liner 24a. This risk highlights the importance of locating the two boundary axes associated with each adhesive-backed anchoring member in a generally central location within the area of the adhesive-backed anchoring member. In preferred examples of the present disclosure, the two boundary axes associated with each adhesive-backed anchoring member are located within an area defined as the central 60%-70% of an adhesive-backed anchoring member.

Figure 3:
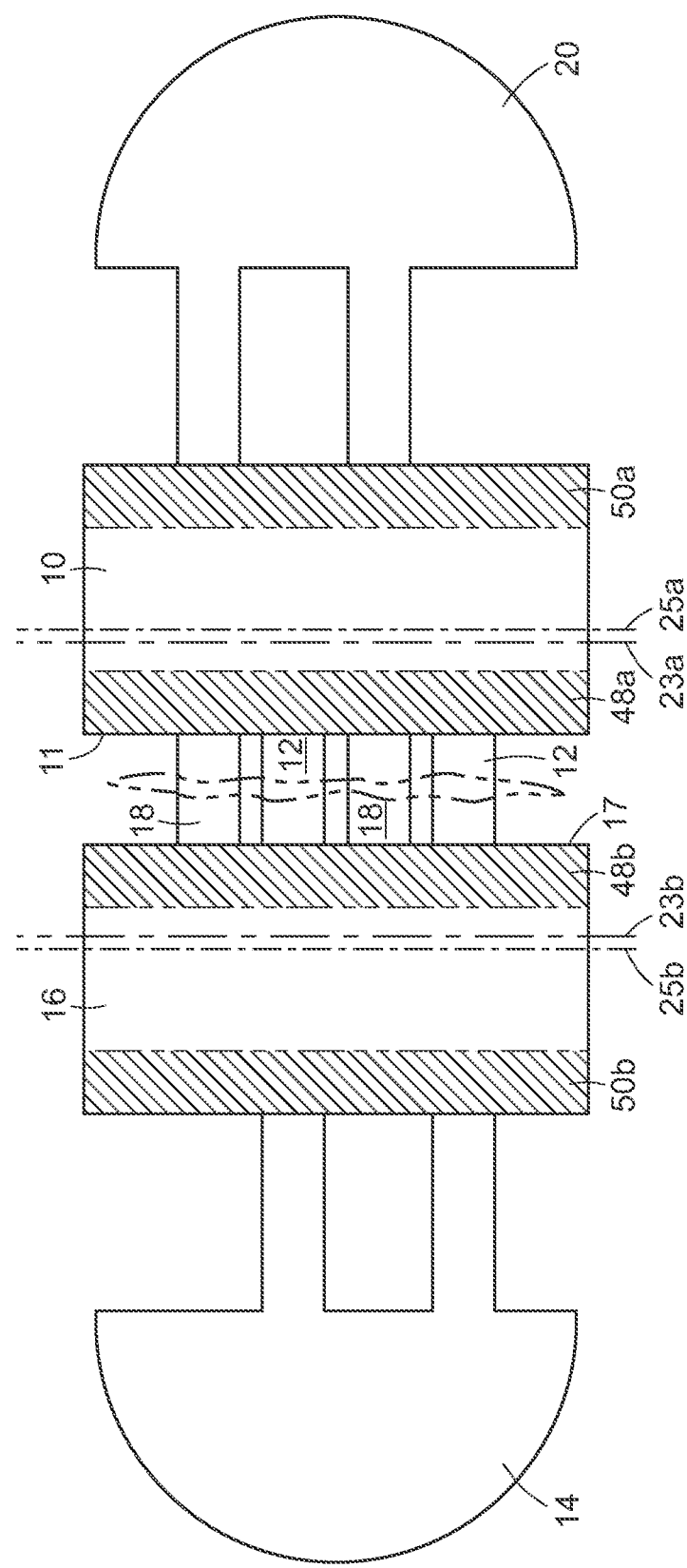
FIG. 3 is a bottom projection view of an interlaced wound closer device of the present disclosure without release liners and showing boundary axes in an area representing a central portion of a first adhesive-backed anchoring member.

Referring to FIG. 3, which is similar to FIG. 1 but for the absence of release liners, the position of boundary axes 23a and 25a are shown in an area representing the central 60%-70% of first adhesive-backed anchoring member 10. Similarly, the position of boundary axes 23b and 25b are shown in an area representing the central 60%-70% of second adhesive-backed anchoring member 16. Boundary axes exclusion zones 48a and 50a are shown in cross-hatching flanking the central 60%-70% of first adhesive-backed anchoring member 10. Boundary axes exclusion zones 48*b* and 50*b* are shown in cross-hatching flanking the central 60%-70% of second adhesive-backed anchoring member 16. Each of the boundary exclusion zones referenced comprises an area no less than 15%-20% of the total area of the adhesive-backed anchoring member that it is associated with. Boundary axes are not positioned within boundary axis exclusion zones. In addition to the elements of FIG. 3 discussed above, also shown are first elongated connectors 12, first pulling element 14, second elongated connectors 18 and second pulling element 20.

Referring again to FIG. 2, the tab portion 30*a* of first release liner 22*a* protecting the first adhesive-backed anchoring member 10, extends from boundary axis 23*a*. Likewise, the tab portion 32*a* of second release liner 24*a* protecting the first adhesive-backed anchoring member 10, extends from boundary axis 25*a*. A similar description can be applied to tab instances associated with second adhesive-backed anchoring member 16. In particular, the tab portion 30*b* of first release liner 22*b*, protecting the second adhesive-backed anchoring member 16, extends from boundary axis 23*b*. Likewise, the tab portion 32*b* of second release liner 24*b*, protecting the second adhesive-backed anchoring member 16, extends from boundary axis 25*b*.

The end points of extension of a particular tab from a particular boundary axis can be said to define a line segment. In embodiments, the line segments defined by two tabs extending from adjacent boundary axes are substantially parallel. The line segments can be of equal or unequal length. As discussed in the following paragraph, the line segments can be the full length of the associated axis, but this is not a requirement. The line segments can be adjacent, overlapping or non-overlapping.

In embodiments of the disclosure, referring to the first adhesive-backed anchoring member, the first and second line segments have a length substantially equivalent to the length of boundary axes 23*a* and 25*a*. In embodiments of the disclosure, referring to the second adhesive-backed anchoring member, the first and second line segments have a length substantially equivalent to the length of the boundary axes 23*b* and 25*b*.

Second Release Liner—Additional Detail

Having discussed the first and second release liners in general terms, additional discussion as to instances of the present disclosure are warranted. Reference numerals used in this section refer to FIG. 2. In all instances of the present disclosure, release liner 2 (i.e., 24*a* and 24*b*) has an unadhered tab portion (i.e., 32*a* and 32*b*) that facilitates removal of release liner 2 (i.e., 24*a* and 24*b*) beginning at the boundary axis (i.e., 25*a* and 25*b*). In other words, the unadhered tab portions 32*a* and 32*b* of release liners 24*a* and 24*b* enable a user to grip unadhered tab portions 32*a* and 32*b* and initiate removal of release liners 24*a* and 24*b* along boundary axes 25*a* and 25*b*. Preferably the removal is initiated at one of two corners of the adhered portions 28*a* and 28*b* located at the termini of boundary axes 25*a* and 25*b*.

Two general tab designs or instances will facilitate removal of second release liners 24*a* and 24*b* as described above. The first tab instance has been discussed briefly. The first tab instance extends from boundary axis 25*a* or 25*b* and enables a medical profession to grip the tab portion and initiate removal at one of two corners of the adhered portions 28*a* and 28*b* located at the termini of boundary axis 25*a* or 25*b*. Such a tab could run the full length of boundary axis 25*a* or 25*b*, thereby enabling a medical professional the option at initiating removal at either of the two corners of the adhered portions 28*a* and 28*b* located at the termini of boundary axes 25*a* and 25*b*. Alternatively the tab could have a length less than the full length of boundary axis 25*a* or 25*b*. In such a case, the tab would be located at, or near, one of the two corners of the adhered portions 28*a* and 28*b* located at the termini of boundary axis 25*a* or 25*b*. This limitation on the location of a tab that is less than the full length of boundary axis 25*a* and 25*b* is required to enable a medical professional to initiate removal at one of the two corners of the adhered portions 28*a* and 28*b* located at the termini of boundary axes 25*a* and 25*b*.

A second general tab design or instance that will facilitate removal of second release liners 24*a* and 24*b* is a tab portion extending from an edge of release liner 24*a* or 24*b* that is not an edge defined by boundary axis 25*a* or 25*b*. In other words, such a tab can be designed to extend from a side edge at, or near, the termini of boundary axes 25*a* and 25*b*. As shown in FIG. 2, for example, such side edges are perpendicular to boundary axes 25*a* and 25*b*.

Referring again to FIG. 2, in instances of the subject disclosure wherein tab portion 32*a* or 32*b* extends the full length of boundary axis 25*a* or 25*b*, in a preferred instance, the tab portions 32*a* and 32*b* of the second release liners 24*a* and 24*b*, when folded back upon the adhered portion 28*a* or 28*b* of second release liner 24*a* or 24*b*, protrudes beyond the adhered portion 28*a* or 28*b*. Such protrusion facilitates the gripping of the tab portion 32*a* or 32*b* following adherence of adhesive exposed by removal of first release liner 22, and the subsequent removal of second release liner 24 wherein the removal is initiated at one of two corners of adhered portions 28*a* and 28*b* located at the termini of boundary axis 25*a* or 25*b*.

Additionally, the folding back of the tab portion 32*a* or 32*b* of the second release liner 24*a* or 24*b* creates a double thickness of release liner. This double thickness can be bent or bowed such that only a narrow central portion of the wound edge 11 or 17 is brought into contact with the skin during the initial application process. This provides a high degree of control enabling precise initial contact with the central portion of the wound edge 11 or 17. Once initial contact is made, tension of the bowed, double thick second release liner 24*a* or 24*b* can be relaxed and the entire wound edge and associated exposed adhesive can be fixed to the skin.

First Release Liner—Additional Detail

Having discussed the second release liner at a higher level of specificity, the first release liner will be addressed at a similar level of specificity. Referring again to FIG. 2, in preferred instances, removal of adhered portions 26*a* and 26*b* of first release liner 22*a* and 22*b* is initiated at one of two corners of the adhered portions 26*a* and 26*b* located at the termini of boundary axes 23*a* and 23*b*. Some of the considerations discussed above in connection with tab portions of the second release liners 24*a* and 24*b* also apply to the tab portions of first release liners 22*a* and 22*b*. For example, to initiate removal of first release liners 22*a* and 22*b* at one of two corners of the adhered portions 26*a* and 26*b* located at the termini of boundary axes 23*a* and 23*b*, a tab portion must be located at or near one of two corners of the adhered portions 26*a* and 26*b* located at the termini of boundary axes 23*a* and 23*b*. As was discussed above in connection with the second release liners 24*a* and 24*b*, such a tab can extend from boundary axes 23*a* and 23*b*, or it can extend from an edge of release liners 22*a* and 22*b* that is not an edge defining wound edge 11 or 17 and not an edge defining boundary axis 23*a* or 23*b*. In other words, such a tab can be designed to extend from a side edge at, or near, the termini of boundary axes 23*a* and 23*b*.

Extensions of First Release Liner

A production consideration, alluded to previously, relates to computer-controlled methods of production of interlaced instances of the present disclosure. Methods for the production of interlaced instances of the present disclosure that are adaptable to computer-controlled methods of production have been developed, publicly disclosed and incorporated herein by reference. Such computer-controlled methods will typically require the coordinated movement of multiple sheets or rolls of polymeric material with cuts or slits introduced in multiple sheets in simultaneous or uncoordinated fashion. The end product of such a process is a collection of individual interlaced two-component medical devices. This production consideration applies also to non-interlaced embodiments.

During such a computer-controlled production process, it is critically important to maintain registration between the various sheets or rolls of polymeric materials, and the elements being formed within those sheets or rolls through the introduction of various cuts or slits. A carrier sheet can be used to maintain such registered relationships between the various sheets or rolls of polymeric material, and the elements being formed within them through the introduction of cuts.

By way of non-limiting example, when designing a plan for a computer-controlled production process for a two-component device according to the present disclosure (including interlaced and non-interlaced instances), two separate sheets or rolls may be employed for the production of first adhesive-backed anchoring member and second adhesive-backed anchoring member. The relative positions of these two components in the final product is fixed at the set-up stage. For example, edges of the sheets or rolls that will represent the wound edge in the final product are set up in a parallel orientation, in the same plane, set apart, for example, by 3 mm to 20 mm. During a stage in the process, an adhesive coating is applied to one side of the sheets or rolls that will represent first adhesive-backed anchoring member and second adhesive-backed anchoring member in the final product. Films representing first and second release liners are applied to protect these adhesive-backed surfaces.

Instances of the first and second release liners have been discussed in some detail above. However, additional specification can be included related to first release liner for the purpose maintaining registration of various sheets and rolls and elements produced from such sheets and rolls.

In this disclosure we provide for extensions of the first release liner, across the spaced-apart zone (3 mm to 20 mm in this example) to provide a carrier to aid in the maintenance of registration between the various sheets or rolls and elements produced from such sheets and rolls. Referring to FIG. 2, to operate effectively as a carrier, the first release liner 22a and first release liner 22b must by physically connected (e.g., using adhesive). For example, two separate first release liners can be extended into or beyond the spaced-apart zone such that they overlap or abut. With overlapping or abutting termini, release liners 22a and 22b can be physically connected through the use of an adhesive-backed tape, for example.

Figure 4A:
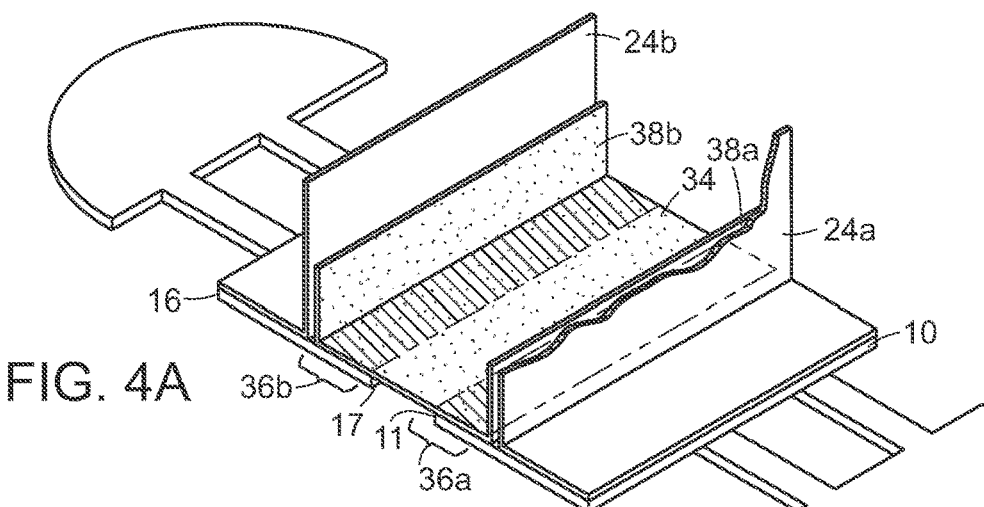
FIG. 4a is a perspective view of an example wherein a common first release liner is shared between two components of a two-component medical device.

FIG. 4a shows diagrammatically an alternative instance of the present disclosure wherein a common first release liner 34 (shown in stippling) is shared between the two components of the two-component medical device. Where possible (i.e., where components are common), numbering used in FIG. 2 is also used in FIGS. 4a-4c. In particular, FIG. 4a is a diagrammatic representation showing first adhesive-backed anchoring member 10 protected by a first adhered portion 36a (cross-hatching) of common release liner 34, and second release liner 24a. The adhesive-backed portion of second adhesive-backed anchoring member 16 is protected by a second adhered portion 36b (cross-hatching) of common release liner 34, and second release liner 24b. First common release liner 34 is provided with a first tab 38a and a second tab 38b. As depicted in the instance shown in FIG. 4a, tabs 38a and 38b are analogous to tabs 30a and 30b as discussed above in connection with FIG. 2. The transition from second adhered portions 36a and 36b of common release liner 34, to tabs 38a and 38b, respectively, are marked by a fold (not numbered).

The first step in the application of the instance depicted in FIG. 4a is the removal of the first adhered portion 36a of common release liner 34 from the first adhesive-backed anchoring member 10. Tab 38a is used to effect removal of first adhered portion 36a of common release liner 34. Preferably the removal is initiated at one of two corners of the first adhered portion 36a located at the termini of boundary axis 23a (not shown). Once first adhered portion 36a of common release liner 34 is removed from first adhesive-backed anchoring member 10, the exposed adhesive is utilized to fix the position of wound edge 11 along one side of the wound or incision. Second release liner 24a is then removed as described in connection with other instances above enabling the entire adhesive backed surface of first adhesive-backed anchoring member 10 to be attached to the skin.

The remaining portion of common release liner 34 is then removed. More specifically, adhered second portion 36b of common release liner 34 is removed from second adhesive-backed anchoring member 16 using, in this instance, tab 38b. Once first adhered portion 36b of common release liner 34 is removed from second adhesive-backed anchoring member 16, the exposed adhesive is utilized to fix the position of wound edge 17 along the second side of the wound or incision. Second release liner 24b is then removed as described in connection with other instances above enabling the entire adhesive backed surface of first adhesive-backed anchoring member 16 to be attached to the skin. Once first adhesive-backed anchoring member 10 and second adhesive-backed anchoring member 16 are applied, the two component device is then adjusted and secured according to conventional techniques.

Figure 4B:
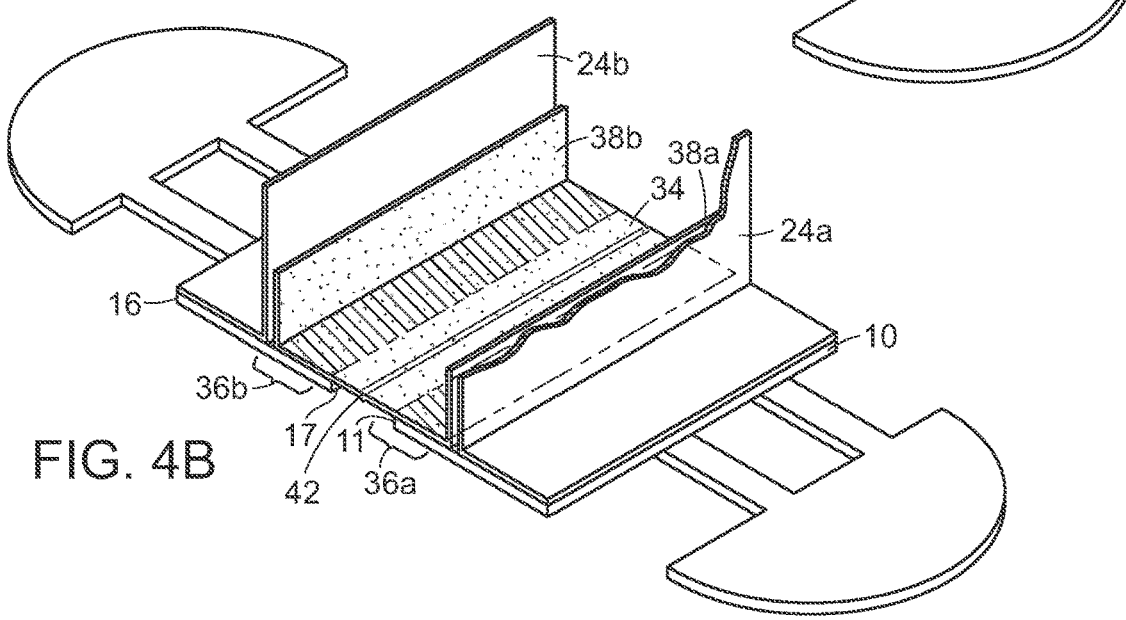
FIG. 4b is a perspective view of an example wherein a crease is provided in a common first release liner shared between two components of a two-component medical device.
Figure 4C:
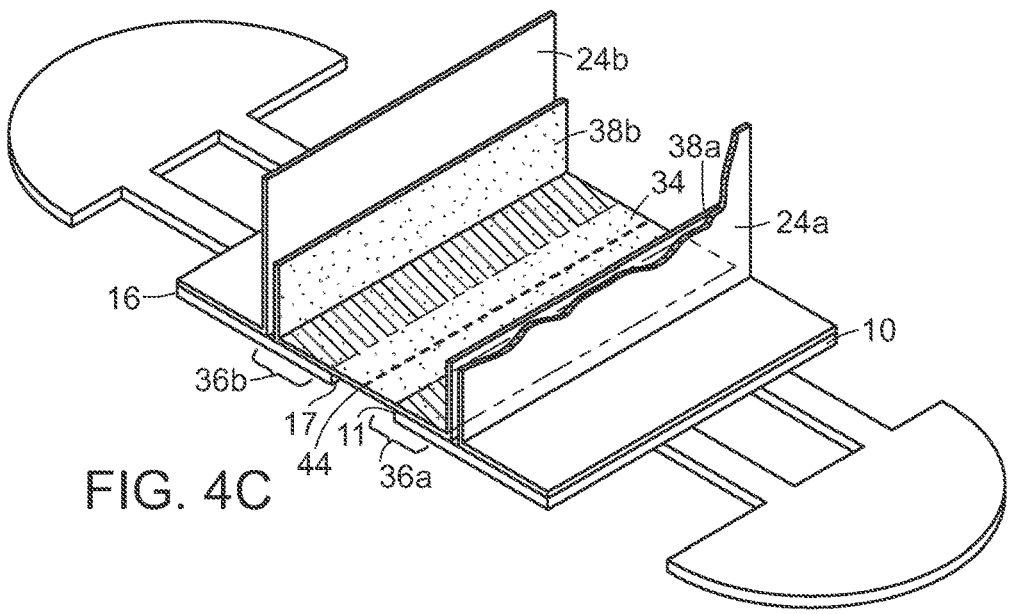
FIG. 4c is a perspective view of an example wherein a frangible line is provided in a common first release liner shared between two components of a two-component medical device.

Alternative instances including a common release liner 34 divided into two zones are shown diagrammatically in FIGS. 4b and 4c. The purpose of introducing two zones into the two-zone instances is to enable a medical professional to more easily apply the two component medical device to the skin by enabling the portion of common release liner 34 released, following removal of first adhered portion 36a from first adhesive-backed anchoring member 10, to be removed from interference with application.

Referring to FIG. 4b, a crease 42 is provided in common release liner 34. Following removal of first adhered portion 36a from first adhesive-backed anchoring member 10, common release liner folds, or is folded along crease 42. Crease 42 provides a convenient feature for a medical profession to "fold away" the loose tail of common release liner 34 while applying the adhesive portion of first adhesive-backed anchoring member 10 exposed by removal of first adhered portion 36a. Depending upon the depth of crease 42, the feature may enable a user to tear off a portion of the loose tail of common release liner along the crease, rather than merely folding it back. Crease 42 is located in a central region of common release liner 34 located between adhered portions 36a and 36b.

Referring to FIG. 4c, a frangible line 44 is provided in common release liner 34. Following removal of first adhered portion 36a from first adhesive-backed anchoring member 10, the loose tail portion is removed by fracturing common release liner 34 along frangible line 44. Frangible line 44 provides a convenient feature enabling a medical professional to remove the loose tail of common release liner 34 while applying the adhesive portion of first adhesive-backed anchoring member 10 exposed by removal of first adhered portion 36a. Frangible line 44 is located in a central region of common release liner 34 located between adhered portions 36a and 36b.

Figure 5:
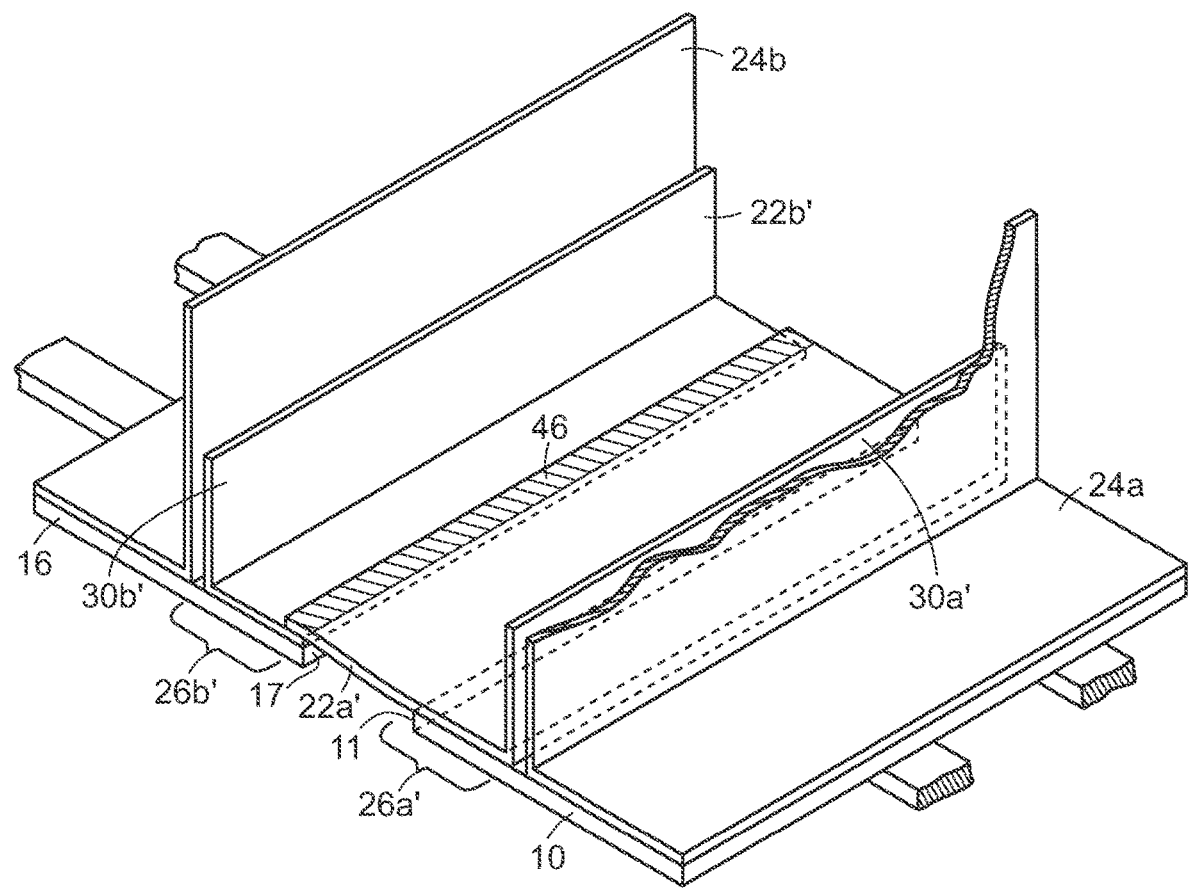
FIG. 5 is a perspective view of an interlaced wound closure device of the present disclosure with a first release liner, of a first adhesive-backed anchoring member, that extends over a first release liner of a second adhesive-backed anchoring member.

FIG. 5 is a diagrammatic representation showing an instance of a two-component medical device of the present disclosure which is substantially similar to the instance described in FIG. 2, but for the presence of extensions of first release liners 22a and 22b (as shown in FIG. 2). In connection with FIG. 5, prime (') designations will be used to refer to reference numerals that refer to elements that differ, due to the extension of first release liners 22a and 22b (as shown in FIG. 2). For example, FIG. 5 is a diagrammatic representation showing first adhesive-backed anchoring member 10 protected by an adhered portion 26a' of first release line 22a', and second release liner 24a. The adhesive-backed portion of second adhesive-backed anchoring member 16 is protected by an adhered portion 26b' of first release liner 22b', and second release liner 24b. First release liner 22a' is provided with a tab 30a'. First release liner 22b' is provide with a tab 30b'.

In the instance represented in FIG. 2 an edge of release liner 22a was collinear with wound edge 11. Similarly, an edge of release liner 22b was collinear with wound edge 17. In the instance represented in FIG. 5, release liners 22a' and 22b' overlap. In the instance shown in FIG. 5 release liner 22b' terminates at wound edge 17, and release liner 22a' extends across the spaced-apart region to overlap release liner 22b'. It is not a requirement that release liner 22b' terminate at wound edge 17. Release liner 22b' can extend into the spaced-apart region as a matter of design choice. The cross-hatched portion 46 of liner 22a' indicates the overlap region. During the production process, the portions of release liners 22a' and 22b' that overlap are physically connected using, for example, adhesive-backed tape.

The first step in the application of the instance depicted in FIG. 5 is the removal of the adhered portion 26a' of release liner 22a' from the first adhesive-backed anchoring member 10. Tab 30a' is used to effect removal of adhered portion 26a' of first release liner 22a'. Preferably the removal is initiated at one of two corners of the adhered portion 26a' located at the termini of boundary axis 23a (not shown). The physical connection between release liners 22a' and 22b' is also broken and first release liner 22a' is completely removed from connection with other components. Following the removal of first release liner 22a' from first adhesive-backed anchoring member 10, the exposed adhesive is utilized to fix the position of wound edge 11 along one side of the wound or incision. Second release liner 24a is then removed as described in connection with other instances above, enabling the entire adhesive backed surface of first adhesive-backed anchoring member 10 to be attached to the skin. The area of overlap between release liners 22a' and 22b' is shown as reference numeral 46.

The process described above is then repeated to apply second adhesive-backed anchoring member 16 to the skin. Once first adhesive-backed anchoring member 10 and second adhesive-backed anchoring member 16 are applied, the two component device is then adjusted and secured according to conventional techniques.

One skilled in the art will recognize that an abutting instance, otherwise identical to the overlapping instance descried in FIG. 5, can be produced by extending release liners 22a' and 22b' only to the point where they abut. For carrier purpose they can be physically connected using adhesive-backed tape, for example.

Figure 6:
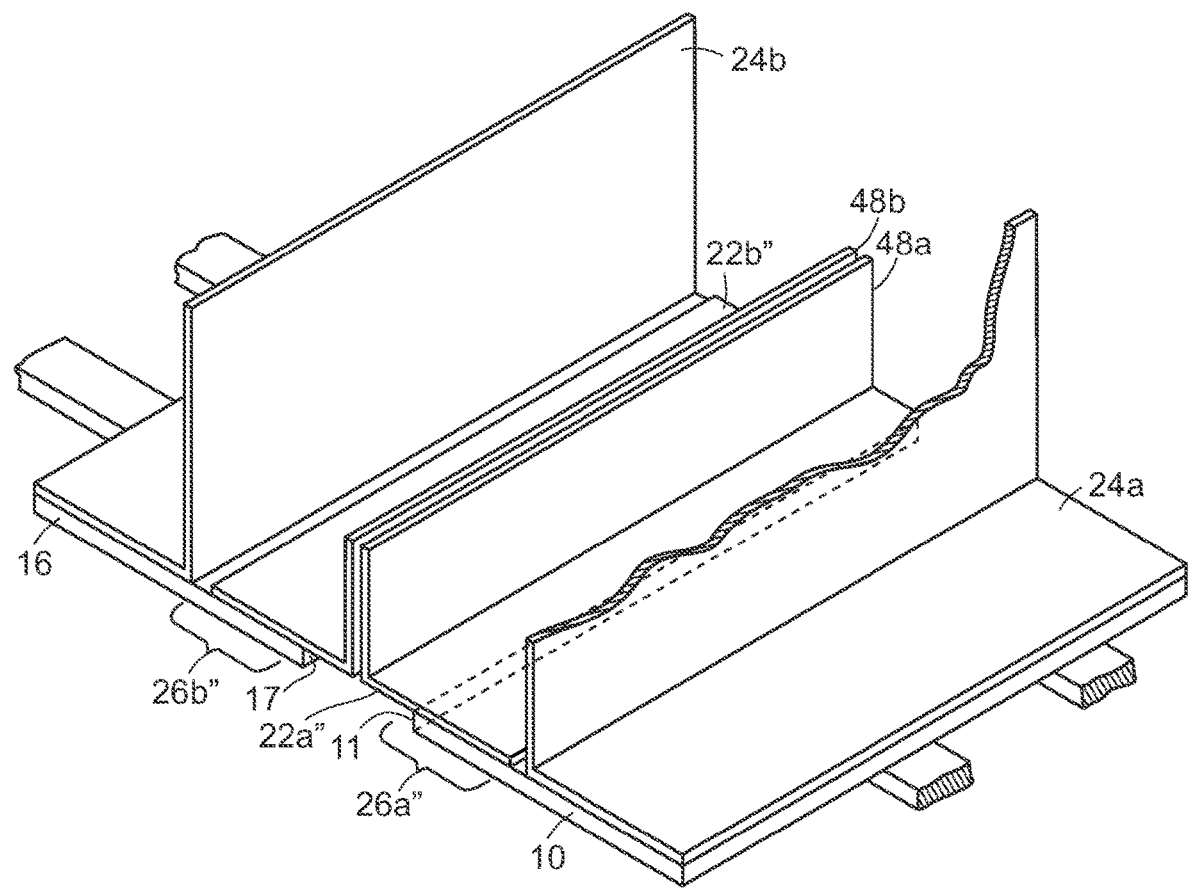
FIG. 6 is a perspective view of an interlaced wound closure device of the present disclosure with first release liners having tabs that extend from wound edges of first and second adhesive-backed anchoring members.

FIG. 6 shows an alternate instance wherein tab portions are provided such that removal of adhered portions 26b" and 26a" begin at wound edges 17 and 11, respectively, and not at boundary axes 23b and 23a, respectively. In particular, FIG. 6 shows tab 48a for removal of first release liner 22a". Tab 48b is provided for removal of release liner 22b". Tab 48a can be described as extending from the portion of release liner 22a" protecting wound edge 11. Similarly, tab 48b can be described as extending from the portion of release liner 22b" protecting wound edge 17. The order of release liner removal and application of the two-component device is generally as described above, but for the removal of adhered portions 26a" and 26b", of first release liners 22a" and 22b", beginning at the wound edges 17 and 11.

What is claimed is:

1. A two-component medical device comprising:
a) a first component comprising a first adhesive-backed anchoring member having a wound edge, one or more first elongated connectors extending from the wound edge of the first adhesive-backed anchoring member, and one or more first pulling elements joined to the one or more first elongated connectors and adapted for translation of the first adhesive-backed anchoring member toward a wound or incision;
b) a second component comprising a second adhesive-backed anchoring member having a wound edge, one or more second elongated connectors extending from the wound edge of the second adhesive-backed anchoring member, and one or more second pulling elements joined to the one or more second elongated connectors and adapted for translation of the second adhesive-backed anchoring member toward the wound or incision;
c) a common release liner comprising a first adhered portion and a second adhered portion, the first adhered portion protecting a first portion of an adhesive-backed surface of the first adhesive-backed anchoring member and having a tab portion for removal of the first adhered portion from the adhesive-backed surface of the first adhesive-backed anchoring member, the second adhered portion protecting a first portion of an adhesive-backed surface of the second adhesive-backed anchoring member and having a tab portion for removal of the second adhered portion from the adhesive-backed surface of the second adhesive-backed anchoring member, wherein the common release liner has a crease or frangible line located between the first adhered portion and the second adhered portion;
d) a first release liner having an adhered portion protecting a second portion of the adhesive-backed surface of the first adhesive-backed anchoring member, the first release liner having a tab portion for removal of the first release liner from the first adhesive-backed anchoring member;
e) a second release liner having an adhered portion protecting a second portion of the adhesive-backed surface of the second adhesive-backed anchoring member, the second release liner having a tab portion for removal of the second release liner from the second adhesive-backed anchoring member;

f) means for attaching the one or more first elongated connectors to the second adhesive-backed anchoring member thereby forming an attached portion and a bridging portion for each attached first elongated connector; and g) means for attaching the one or more second elongated connectors to the first adhesive-backed anchoring member thereby forming an attached portion and a bridging portion for each attached second elongated connector.

2. The two-component medical device of claim 1, wherein the tab portion of the first release liner is an unadhered portion of a first stock used to produce the adhered portion of the first release liner, or is produced from a second stock and attached to the first stock used to produce the adhered portion of the first release liner.

3. The two-component medical device of claim 1, wherein the tab portion of the first release liner extends beyond the adhesive-backed surface of the first adhesive-backed anchoring member.

4. The two-component medical device of claim 1, wherein the adhered portion of the first release liner has a boundary axis that is parallel with the wound edge of the first adhesive-backed anchoring member and defines a boundary of the adhered portion of the first release liner, and the tab portion of the first release liner extends from the boundary axis.

5. The two-component medical device of claim 1, wherein:
the tab portion, of the first adhered portion of the common release liner, defines a first segment at its point of extension from its boundary axis;
the tab portion, of the first release liner, defines a second line segment at its point of extension from its boundary axis; and
the first and second line segments are substantially parallel and adjacent.

6. The two-component medical device of claim 5, wherein:
the first and second line segments have a length substantially equivalent to a length of the boundary axes of the common release liner and the first release liner.

7. The two-component medical device of claim 1, wherein the first adhesive-backed anchoring member is produced from an inelastic stock or an elastic stock reinforced with an inelastic structural material.

8. The two-component medical device of claim 1, wherein the common, first, and second release liners are coded to indicate a sequence of removal.

9. The two-component medical device of claim 1, wherein the first adhesive-backed anchoring member is provided with one or more alignment indicators.

10. The two-component medical device of claim 1, wherein the one or more first elongated connectors and the one or more second elongated connectors are spaced-apart to facilitate lateral adjustment of the first adhesive-backed anchoring member relative to the second adhesive-backed anchoring member.

11. The two-component medical device of claim 1, wherein the first adhesive-backed anchoring member is produced from an elastic polymeric material not reinforced with an inelastic structural material.

12. The two-component medical device of claim 1, wherein the first adhesive-backed anchoring member is made from an inelastic material that is altered by mechanical manipulation.

13. The two-component medical device of claim 12, wherein the mechanical manipulation comprises one or more discontinuities selected from the group consisting of slices, perforations, and punches.

14. The two-component medical device of claim 13, wherein the mechanical manipulation comprises the slices in the first adhesive-backed anchoring member.

15. The two-component medical device of claim 12, wherein the mechanical manipulation increases breathability of the inelastic material.

16. The two-component medical device of claim 12, wherein the mechanical manipulation facilitates transfer of sweat from skin beneath the first adhesive-backed anchoring member when in use.

17. The two-component medical device of claim 12, wherein the mechanical manipulation results in elastic-like properties.

18. The two-component medical device of claim 1, wherein the first adhesive-backed anchoring members are perforated or slit in a direction generally perpendicular to the wound edge of the first adhesive-backed anchoring member.

19. The two-component medical device of claim 1, wherein the one or more first elongated connectors and the one or more second elongated connectors are interlaced.

20. The two-component medical device of claim 1, wherein the one or more first elongated connectors and the one or more second elongated connectors are mated in a keyhole arrangement.

* * * * *

UNITED STATES PATENT AND TRADEMARK OFFICE
CERTIFICATE OF CORRECTION

PATENT NO. : 12,440,212 B2  
APPLICATION NO. : 18/002001  
DATED : October 14, 2025  
INVENTOR(S) : Michael Lebner Page 1 of 1

It is certified that error appears in the above-identified patent and that said Letters Patent is hereby corrected as shown below:

In the Claims

In Claim 18, Line 2, please replace "members are" with --member is--.

Signed and Sealed this  
Twenty-fifth Day of November, 2025

John A. Squires  
*Director of the United States Patent and Trademark Office*